United States Patent Office 2,869,887
Patented Jan. 20, 1959

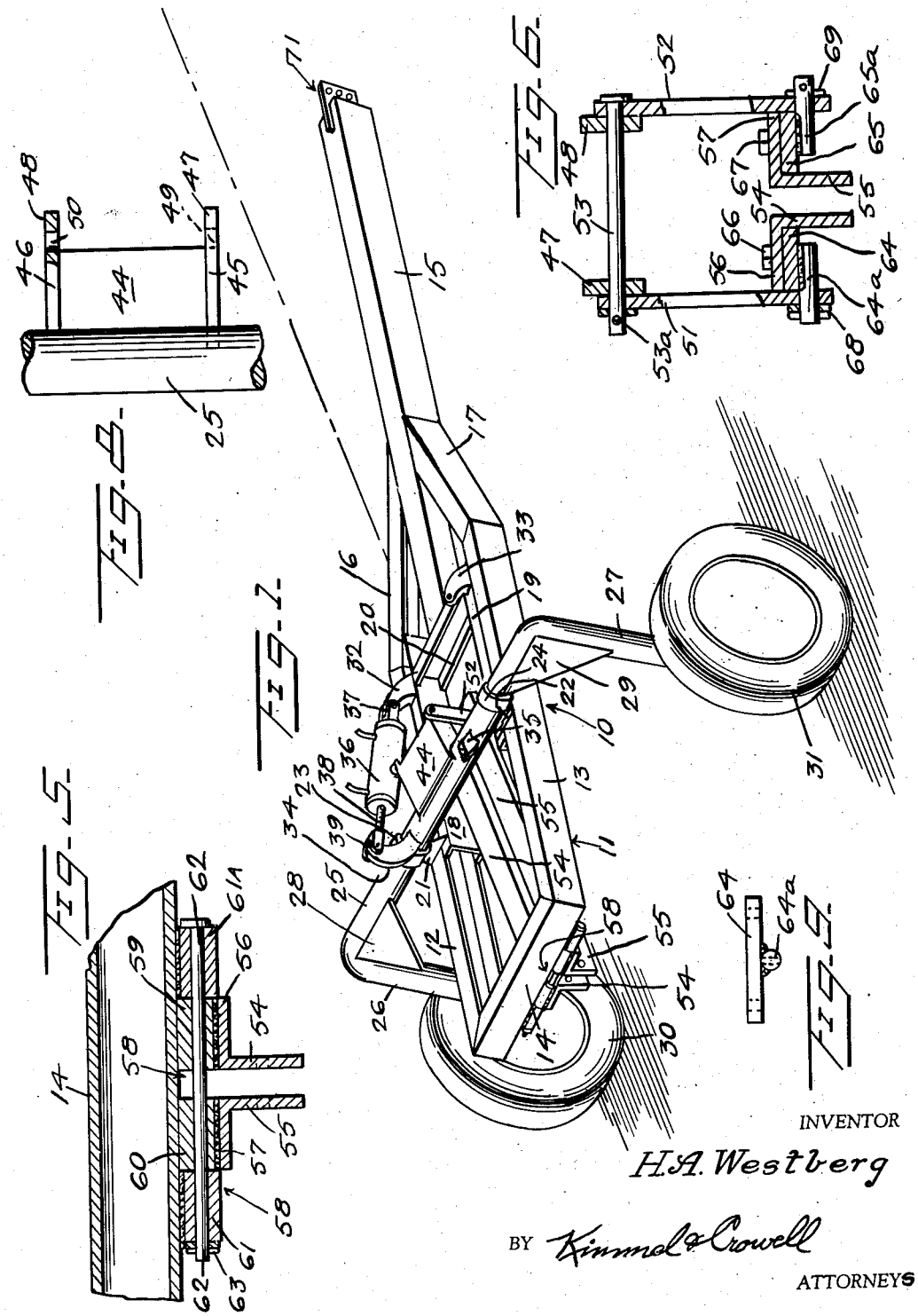

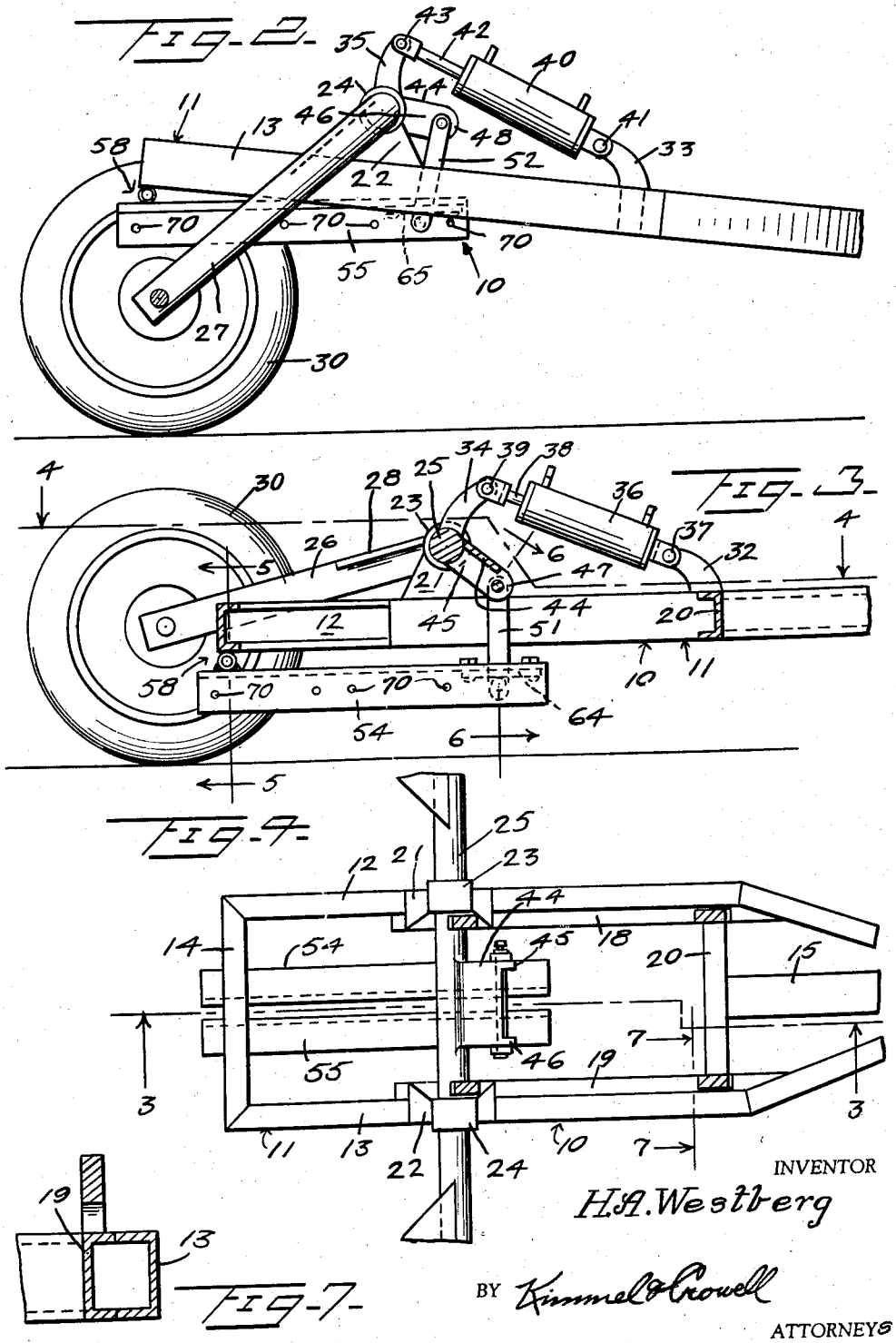

2,869,887

MOBILE TOOL CARRIER

Harold A. Westberg, Salina, Kans., assignor to The Wyatt Manufacturing Co., Inc., Salina, Kans.

Application January 23, 1957, Serial No. 635,636

6 Claims. (Cl. 280—44)

The present invention relates to tool carriers, and more particularly to such devices which are adapted to carry and elevate tools while maintaining them level with the earth's surface.

The primary object of the invention is to provide a wheeled tool carrying trailer arranged for adjustment with relation to the ground while maintaining the tool in level position with the ground.

Another object of the invention is to provide a tool carrier of the class described above in which the adjustment of the tool carrying portion and of the elevating portion are simultaneously operated by the same means.

A further object of the invention is to provide a tool carrier of the class described above which is inexpensive to manufacture, simple to operate, and which is completely effective in its action.

Other objects and advantages will become apparent in the following specification when considered in the light of the attached drawings, in which:

Figure 1 is a perspective view of the invention illustrated in fully elevated position.

Figure 2 is a side elevation of the invention with parts broken away for clarity, illustrated in partially elevated condition.

Figure 3 is a fragmentary longitudinal cross-section taken along the line 3—3 of Figure 4, looking in the direction of the arrows, with the parts shown in unelevated position.

Figure 4 is a fragmentary horizontal cross-section taken along the line 4—4 of Figure 3, looking in the direction of the arrows.

Figure 5 is an enlarged fragmentary transverse cross-section taken along the line 5—5 of Figure 3, looking in the direction of the arrows.

Figure 6 is an enlarged fragmentary transverse cross-section taken along the line 6—6 of Figure 3, looking in the direction of the arrows.

Figure 7 is an enlarged fragmentary transverse cross-section taken along the line 7—7 of Figure 4, looking in the direction of the arrows.

Figure 8 is a fragmentary bottom plan view of a detail of the invention shown partially broken away and in section.

Figure 9 is a side elevation of the pivot block.

Referring now to the drawings in detail wherein like reference characters indicate like parts throughout the several figures, the reference numeral 10 indicates generally a tool carrying trailer constructed in accordance with one embodiment of the invention.

The trailer 10 comprises a generally U-shaped framework 11 having a pair of parallelly arranged side channel frame members 12 and 13 which are connected at one end by a rear cross channel member 14, as best illustrated in Figures 1 and 4. An elongated rectangular tongue 15 is positioned on a line extending medially of the side frame members 12 and 13 and generally forward of the side members 12 and 13. A pair of converging frame members 16 and 17 are secured to the forward ends of the frame members 12 and 13, respectively, converging inwardly to the tongue 15 to which they are secured by any suitable means such as welding or the like. Channel members 18 and 19 are secured to the frame members 12 and 13, respectively, and extend from their forward ends to a point spaced substantially from their rear ends. A channel transverse frame 20 extends between and is secured to the channel members 18 and 19 adjacent their forward ends and is welded or otherwise secured to the rear end of the tongue 15.

A pair of pillars 21 and 22 are positioned on and are secured to the channels 12 and 13, respectively, and extend inwardly in engagement with the channels 18 and 19, respectively, as seen in Figure 4. A bearing 23 is secured to the top of the pillar 21 while a bearing 24 is secured to the top of the pillar 22. The bearings 23 and 24 are aligned and have a shaft 25 journalled therein so as to extend transversely of the frame 11 parallel to the cross members 14 and 20.

The shaft 25 is provided with offset depending arms 26 and 27 integrally secured to the opposite ends thereof in perpendicular relation thereto to form a U-shaped yoke. Brace plates 28 and 29 extend between the shaft 25 and arm 26 and shaft 25 and arm 27, respectively and are secured thereto by means of welding or the like. Rubber tired wheels 30 and 31 are journalled on the free ends of the arms 26 and 27, respectively, with their axes in aligned relation.

A pair of arcuately rearwardly curved ears 32 and 33 are secured to the channels 18 and 19 adjacent the opposite ends of the cross channel 20, as seen in Figure 1. A pair of ears 34 and 35 extend arcuately forwardly from the shaft 25 and are welded thereto in aligned relation, respectively, to the ears 32 and 33.

A hydraulic ram 36 is pivotally connected at 37 to the ear 32 and has a piston rod 38 thereof pivotally connected to the ear 34 at 39. A second hydraulic ram 40 identical to the hydraulic ram 36 is pivotally connected to the ear 33 at 41 and has a piston rod 42 extending therefrom pivotally connected to the ear 35 at 43. The hydraulic rams 36 and 40 are adapted to be actuated to rotate the shaft 25 within the bearings 23 and 24 so as to move the arms 26 and 27 to elevate the frame 11 with respect to the wheels 30 and 31.

A short plate 44 is welded along one edge to the shaft 25 and along opposite side edges to depending side plates 45 and 46. The side plates 45 and 46 have portions 47 and 48 which extend beyond the plate 44 and carry bores 49 and 50 therein in aligned relation. The plate 44 and the plates 45 and 46 extend generally oppositely to the arms 26 and 27. A pair of links 51 and 52 are pivotally secured at one end, respectively, thereof to the end portions 47 and 48 by means of an elongated pivot pin 53 extending through the bores 49 and 50 and held in place by a key 53a.

A pair of angle irons 54 and 55 are arranged in spaced parallel relation with one of their flanges 56 and 57 respectively, arranged uppermost in generally horizontal aligned relation. A hinge, generally indicated at 58, has one portion 59 thereof secured to the flange 56 of the angle iron 54 adjacent the rear end thereof, and an element 60 of the hinge 58 is secured to the flange 57 of the angle iron 55 adjacent the rear end thereof in aligned relation to the element 59.

A pair of hinge elements 61, 61a of the hinge 58 are secured in laterally spaced aligned relation to the underside of the transverse channel 14 intermediate its ends. The elements 59, 60, 61 and 61a are arranged in aligned relation, as illustrated in Figure 5, and are pivotally secured together by means of a pintle 62 passing therethrough. The pintle 62 is secured in the hinge 58 by a pin 63. The opposite ends of the angle irons 54 and 55 are provided with pivot blocks 64 and 65, respectively, which are secured to the underside of the flanges 56 and 57 by bolts 66 and 67 which extend through the pivot blocks 64 and 65, respectively. The pivot blocks 64 and 65 are provided with pivot pins 64a and 65a which are welded thereto in laterally extending position and have the lower ends of the links 51 and 52, respectively, secured thereto by means of securing members 68 and 69, respectively.

With this arrangement, it can be seen that the angle irons 54 and 55 will be rotated about the hinge 58 by means of the links 51 and 52 when the shaft 25 is rotated as explained above. The angle irons 54 and 55 remaining generally parallel to the earth's surface.

The angle irons 54 and 55 are provided with a plurality of bores 70 through the vertical flanges thereof in aligned relation to receive attaching bolts (not shown) for attaching tools to the angle irons 54 and 55.

In the use and operation of the invention, a tool to be carried by the device is secured between the angle irons 54 and 55 by standard attaching bolts passing through the bores 70 therein.

The tool can be of any desired type and may include subsoil machinery, pipe laying machinery, fertilizing equipment, plows, harrows, cultivators, log yokes, and any other tool in which the maintenance of a level relationship with the earth's surface is important.

The hydraulic cylinders 36 and 40 are actuated by any hydraulic pump (not shown) rotating the shaft 25 in the bearings 23 and 24 thus raising the frame 11 on the wheels 30 and 31. Reversed action of the hydraulic cylinders 36 and 40 will lower the frame 11 on the wheels 30 and 31 to a desired point.

The angle irons 54 and 55 forming a carriage for the tool mounted thereon, remain generally level with relation to the earth's surface regardless of the extent of the raising of the frame 11. The forward end of the tongue 15 is provided with a tractor coupling generally indicated at 71 which is adapted to be attached to a standard tractor in a conventional manner.

Having thus described the preferred embodiment of the invention, it should be understood that numerous structural modifications and adaptations may be resorted to without departing from the scope of the appended claims.

What is claimed is:

1. A tool carrier comprising a frame, means at one end of said frame for detachably connecting said frame to a traction vehicle, a shaft extending transversely of said frame and journalled thereon, arms depending perpendicularly of said shaft in parallel relation, wheels journalled on the free ends of said arms with their axes in aligned relation, means mounted on said frame and connected to said shaft to rotate said shaft for raising and lowering said frame with respect to the ground, a tool carriage, a hinge structure pivotally securing the rear end portion of said tool carriage directly to the rear end of said frame, and means extending from said shaft to the front end of said carriage for moving said carriage pivotally on said hinge whereby said carriage is maintained in level relation to the supporting ground as said frame is raised and lowered on said wheels.

2. A device as claimed in claim 1 wherein said means for supporting and moving said carriage includes links pivotally secured at one end to the forward end portion of said carriage and pivotally secured to an arm fixed to and extending from said shaft at their opposite ends.

3. A device as claimed in claim 1 wherein said shaft is provided with upstanding ears, and said means on said frame for rotating said shaft includes hydraulic rams pivotally connected at their opposite ends to said frame and to said ears.

4. A device as claimed in claim 1 wherein said carriage includes a pair of elongated angle irons arranged in spaced parallel relation with said angle irons including upper outwardly extending aligned flanges.

5. A device as claimed in claim 1 wherein said means for rotating said shaft on said frame includes a pair of oppositely disposed spaced parallel hydraulic rams pivotally secured at one end to said frame and at the opposite end to said shaft.

6. A tool carrier comprising a frame, means at one end of said frame for detachably connecting said frame to a traction vehicle, a shaft extending transversely of said frame and journalled thereon, arms depending perpendicularly of said shaft in parallel relation, wheels journalled on the free ends of said arms with their axes in aligned relation, a pair of ears formed integrally on and extending outwardly from said shaft intermediate the ends thereof, a second pair of ears formed integrally on said frame and being aligned with a respective one of said first named ears, a pair of hydraulic rams each having one end thereof pivotally connected to a respective one of said second named ears, a piston rod extending from the other end of each of said rams, each of said piston rods being pivotally connected to a respective one of said first named ears, a plate fixedly secured to said shaft intermediate said first named ears and extending generally in a direction opposite to that of said arms, a tool carriage, a hinge structure mounted on the other end of said frame and pivotally securing one end of said tool carriage to said frame, and link means, said link means having one end thereof pivotally secured to said plate and the other end thereof pivotally secured to the other end of said tool carriage whereby said carriage is maintained in level relation to the supporting ground as said frame is raised and lowered on said wheels upon movement of the hydraulic ram.

References Cited in the file of this patent

UNITED STATES PATENTS

| | | |
|---|---|---|
| 1,844,124 | Jordan | Feb. 9, 1932 |
| 2,269,519 | Christenson | Jan. 13, 1942 |